US008467714B2

(12) United States Patent
Ziv-El et al.

(10) Patent No.: US 8,467,714 B2
(45) Date of Patent: *Jun. 18, 2013

(54) METHOD AND SYSTEM FOR ONLINE TEACHING USING WEB PAGES

(75) Inventors: Shimon G. Ziv-El, Milwaukee, WI (US); Robert Tolly, Madison, WI (US); Michael Dunk, Madison, WI (US)

(73) Assignee: Educational Testing Service, Princeton, NJ (US)

(*) Notice: Subject to any disclaimer, the term of this patent is extended or adjusted under 35 U.S.C. 154(b) by 1332 days.

This patent is subject to a terminal disclaimer.

(21) Appl. No.: 11/102,994

(22) Filed: Apr. 11, 2005

(65) Prior Publication Data

US 2005/0233296 A1  Oct. 20, 2005

Related U.S. Application Data

(63) Continuation of application No. 09/760,267, filed on Jan. 12, 2001, now Pat. No. 6,898,411.

(60) Provisional application No. 60/181,568, filed on Feb. 10, 2000, provisional application No. 60/226,981, filed on Aug. 22, 2000.

(51) Int. Cl.
*G09B 3/00* (2006.01)
(52) U.S. Cl.
USPC .......................................... 434/350; 434/362
(58) Field of Classification Search
USPC ................................................ 434/350, 362
See application file for complete search history.

(56) References Cited

U.S. PATENT DOCUMENTS

| 5,002,491 | A | * | 3/1991 | Abrahamson et al. | 434/322 |
| 5,176,520 | A | * | 1/1993 | Hamilton | 434/350 |
| 5,180,309 | A | * | 1/1993 | Egnor | 434/323 |
| 5,263,869 | A | * | 11/1993 | Ziv-El | 709/204 |
| 5,295,836 | A | * | 3/1994 | Ryu et al. | 434/335 |
| 5,437,555 | A | * | 8/1995 | Ziv-El | 434/336 |
| 5,574,840 | A | * | 11/1996 | Kwatinetz et al. | 715/272 |

(Continued)

OTHER PUBLICATIONS

Contemporaneously—Definitions from Dictionary.com 2000, [online], [retrieved on Feb. 8,2007] Retrieved from the American Heritage Dictionary of the English Language, Fourth Edition, Houghton Mifflin Co. via Dictionary.com using Internet: <URL: http://dictionary.reference.com/browse/contemporaneously>.*

(Continued)

*Primary Examiner* — Nikolai A Gishnock
(74) *Attorney, Agent, or Firm* — Jones Day

(57) ABSTRACT

A teaching and learning method and system (143, 145, 147, 148, 152) communicates exercises, including URL's of Web pages and questions related thereto. Each exercise is distributed by the teacher's computer (143), synchronously, or downloaded by a student computer (147), asynchronously. An indicator (129) used on the Web page of one computer can be viewed on the same Web page displayed on the other computers. Responses are processed by the response server (145) and by comparison and evaluation logic, and displayed contemporaneously on the teacher's computer, together with scoring information (105, 106) and with URL's (107) associated with links used on each student computer. Scores are awarded automatically, or arbitrarily by clicking on the screen (105) of the teacher's computer. A feedback signal (80) may appear on the student computer with each keystroke to indicate its correctness. Responses selected on the teacher's computer may viewed on the student computers or on a Class Display (171).

15 Claims, 12 Drawing Sheets

U.S. PATENT DOCUMENTS

| | | | | |
|---|---|---|---|---|
| 5,722,418 A | * | 3/1998 | Bro | 600/545 |
| 5,727,950 A | * | 3/1998 | Cook et al. | 434/350 |
| 5,827,070 A | * | 10/1998 | Kershaw et al. | 434/322 |
| 5,862,329 A | * | 1/1999 | Aras et al. | 709/204 |
| 5,862,330 A | * | 1/1999 | Anupam et al. | 709/204 |
| 5,867,653 A | * | 2/1999 | Aras et al. | 709/204 |
| 5,957,698 A | * | 9/1999 | Dean et al. | 434/350 |
| 5,974,446 A | * | 10/1999 | Sonnenreich et al. | 709/204 |
| 6,032,141 A | * | 2/2000 | O'Connor et al. | 706/45 |
| 6,052,130 A | * | 4/2000 | Bardon et al. | 345/666 |
| 6,078,948 A | * | 6/2000 | Podgorny et al. | 709/204 |
| 6,144,991 A | * | 11/2000 | England | 709/205 |
| 6,149,441 A | * | 11/2000 | Pellegrino et al. | 434/350 |
| 6,155,840 A | * | 12/2000 | Sallette | 434/323 |
| 6,164,974 A | * | 12/2000 | Carlile et al. | 434/322 |
| 6,201,948 B1 | * | 3/2001 | Cook et al. | 434/350 |
| 6,230,171 B1 | * | 5/2001 | Pacifici et al. | 715/201 |
| 6,240,444 B1 | * | 5/2001 | Fin et al. | 709/205 |
| 6,288,753 B1 | * | 9/2001 | DeNicola et al. | 348/586 |
| 6,302,698 B1 | * | 10/2001 | Ziv-El | 434/323 |
| 6,411,989 B1 | * | 6/2002 | Anupam et al. | 709/204 |
| 6,463,460 B1 | * | 10/2002 | Simonoff | 709/203 |
| 6,514,085 B2 | * | 2/2003 | Slattery et al. | 434/335 |
| 6,516,340 B2 | * | 2/2003 | Boys | 709/204 |
| 6,611,822 B1 | * | 8/2003 | Beams et al. | 706/11 |
| 6,654,947 B1 | * | 11/2003 | North et al. | 717/101 |
| 6,760,748 B1 | * | 7/2004 | Hakim | 709/204 |
| 6,898,411 B2 | * | 5/2005 | Ziv-el et al. | 434/350 |
| 7,003,728 B2 | * | 2/2006 | Berque | 715/753 |
| 7,834,819 B2 | * | 11/2010 | Dunn et al. | 345/1.1 |
| 2001/0037365 A1 | * | 11/2001 | Montague et al. | 709/204 |
| 2003/0059750 A1 | * | 3/2003 | Bindler et al. | 434/236 |
| 2006/0014132 A1 | * | 1/2006 | Hamilton | 434/365 |

OTHER PUBLICATIONS

Homologous—Definitions from Dictionary.com 2000, [online], [retrieved on Feb. 8, 2007] Retrieved from the American Heritage Dictionary of the English Language, Fourth Edition, Houghton Mifflin Co. via Dictionary.com using Internet: <URL: http://dictionary.reference.com/browse/homologous>.*

* cited by examiner

METHOD AND SYSTEM FOR ONLINE TEACHING USING WEB PAGES

CROSS-REFERENCE TO RELATED APPLICATIONS

This is a continuation of U.S. application Ser. No. 09/760,267, issued as U.S. Pat. No. 6,898,411, filed Jan. 12, 2001 titled "METHOD AND SYSTEM FOR ON-LINE TEACHING USING WEB PAGES", which incorporated herein in it entirety and which claims the benefit of priority is claimed herein for Ziv-el et al. U.S. Provisional App. No. 60/181,568 filed Feb. 10, 2000; and Ziv-El et al., U.S. Provisional App. No. 60/226,981 filed Aug. 22, 2000.

TECHNICAL FIELD

This invention relates to a teaching and learning system and method which incorporates the use of Web site material and which can be implemented using the Internet as the communications network.

BACKGROUND ART

With the development of the Internet, two facets of teaching have been greatly facilitated. The first is the availability of information on the World Wide Web (or Web for short). The second is the technique of teaching at a distance, so referred to as "distance learning." Because the costs of communications have become relatively low, schools at all levels are considering introducing distance learning techniques to accommodate students who may be absent, for example, due to illness, by teaching them simultaneously as if they were present in the classroom. It is obviously advantageous if the methodology of teaching is the same, whether used only within the confines of a classroom or used in combination with distance learning. This includes the methodology for the incorporation and use of Web-based material in a lesson and the use of Web browsers, which is the subject of the present invention.

At present, a system is known where material from a Web page is shown on students' screens, and a text box is provided for the students to answer a multiple-choice question. An example can be found on the Web site of One Touch Systems Inc. A system is also known where a text box is provided for entry of a multi-character word, sentence or paragraph response similar to a chat window, in the latter type of response, after a student completes a response, a "Submit" or "Enter" key must be executed, before the instructor is able to see the student's response—it does not happen immediately. An example of this system is the eSchool system of ACTV Inc.

The use of a "Submit" or "Enter" key is educationally and practically undesirable for the following reasons. It has been demonstrated by studies that one-on-one tutoring is the most effective methodology of teaching. For example, see Bloom, B. S. "The 2 Sigma Problem: The Search for Methods of Group Instruction as Effective as One-to-one Tutoring." *Educational Researcher*, 13(6), June/July, 1984, p. 4-16). In one-on-one teaching, the teacher is aware the moment the student starts to respond, and the teacher is able to interrupt the student, if the teacher believes that the teacher's question or statement was not understood. The problem with the use of a Submit key, is that in distance learning, where the teacher is teaching a lesson to a multiplicity of students, the teacher must wait after asking a question because the teacher does not know whether the students have heard or received the question, until some students completely formulate their responses, and then press their "Submit" or "Enter" key.

Other problems include how to automatically evaluate or manually grade such responses and how to automatically provide reinforcement feedback to students.

The addition of two-way video is helpful in knowing whether the question was heard, although the teacher can seldom see more than a few students on the teacher's screen at the same time. Indeed, even where the system is an Intranet confined to a single classroom, the teacher is idle until a number of completed responses have arrived, in order to know whether the question has not only been heard but also generally understood. This makes the teacher anxious and obviously consumes a lot of time.

Another shortcoming with present systems, where each student is required to use hypertext links on a Web page which accompanies a question submitted to the students, is that the teacher cannot follow precisely which links each student is using or has used to answer a question. Also, after illustrating an idea via a Web page shown on the screens of the students' computers, the teacher should be able to point out or indicate an item on the Web page, while verbally explaining the content of the Web page. Also, in addition to presenting a question and a Web page, an automatic feedback mechanism should be available on the students' screens to immediately inform a student when the student strays from the teacher's authored correct answer, or to reinforce through feedback, the moment the student correctly completes a response.

Furthermore, even in the absence of a teacher-authored answer, the teacher should be able to score responses on-line and to supply feedback to the students accordingly.

SUMMARY OF THE INVENTION

The present invention enables a teacher to author and publish an exercise to a group of students working the Internet or an Intranet. The exercises can include Web pages with links, rich text format (formatted text and graphics) with questions relating to the Web pages, as well as an "Answer" text box, and to further provide for letter-by-letter monitoring and evaluation of each student's response in relation to a teacher-authored answer and to supply automatic feedback accordingly.

The present invention further provides for the exercises to be published on a number of student computers, in at least one of two ways: either broadcast by the teacher to the students, which is referred to as synchronous or Social Mode teaching, or selected by each student, which is referred to as asynchronous or Self-paced Mode teaching. The present invention further enables the students to utilize any hypertext links in the Web page to access other Web pages. The present invention enables the students' responses to be communicated to the teacher's screen in real time and character-by-character. In addition, the URL's of the Web pages accessed by the students are communicated to the teacher's screen.

It is a further object of the present invention to enable a teacher to score responses online and supply a feedback signal to students where the responses are unanticipated, i.e., not present amongst the authored answers.

It is a further object of the present invention to enable a student to interrupt a response in an "Answer" text entry box in order to give an explanation of an intended answer in a separate explanation text entry box, and then possibly return to complete the response in the "Answer" text entry box. Additionally, a student should be able to interrupt either the answer or the explanation, in order to use a chat facility to ask or answer a private question.

The present invention also provides for indicator tools enabling the teacher to use a live pointer, or mark up a Web page, on the teacher's screen, and simultaneously show a corresponding pointer, or mark up the corresponding Web page on one or more student screens. Similarly, a student is enabled to exercise similar pointing and marking functions on the teacher's and other students' screens.

It is a further object of the present invention to enable a teacher to follow on the teacher's screen the responses to a question, contemporaneously with the students typing their responses and to also see the Web links or URL's that the students use or have used, in order to arrive at their responses.

The present invention allows the teacher to display selected student responses on the screens of all of the students. The present invention further enables the teacher to obtain a URL accessed by a student, in order to place the associated Web page on the teacher's screen. It is a further object of the present invention to enable the teacher to preview a Web site page immediately on demand without necessarily downloading information from the Web site at the time of the previewing.

It is a further object of the present invention to enable a teacher to import Web pages into the lesson and make them accessible to students, without the teacher having to load them on a Web server.

The present invention enables the teacher to import Web pages and have them stored with the lesson in a location where students can access them.

The present invention further provides for the creation of a thumbnail preview picture of a Web site page to be stored in the database when an exercise is being authored.

Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

DETAILED DESCRIPTION OF THE PREFERRED EMBODIMENTS

A Web browser is a computer application program that displays and manipulates documents received over the World Wide Web. Documents written for delivery on the Internet are most often written in the Hypertext Markup Language, HTML. Those HTML documents are transported using the Hypertext Transfer Protocol, HTTP and hence Web servers are also referred to as HTTP servers. A Web browser includes the use of programs such as applets and plug-ins. A JAVA applet is a program that runs within a JAVA-enabled Web browser. A plug-in is loaded and becomes part of the browser by extending the browser's capabilities.

In the present invention, a lesson used by a teacher to teach students includes one or more exercises, also referred to as "lesson frames" or simply "frames." There are different types of exercises including Q&A (Question and Answer) where the student must respond to a question with a single answer or with one out of several correct answers or with more than one answer out of several correct answers. Another exercise type is the fill-in-the-blanks type where the student must fill in, for example, two blank spaces in a sentence, with words, the order of which may or may not be important. Another is the well-known multiple choice type. Another is the open-ended or essay type where the student is expected to respond to a question freely using the student's own choice of words.

Figure 1:
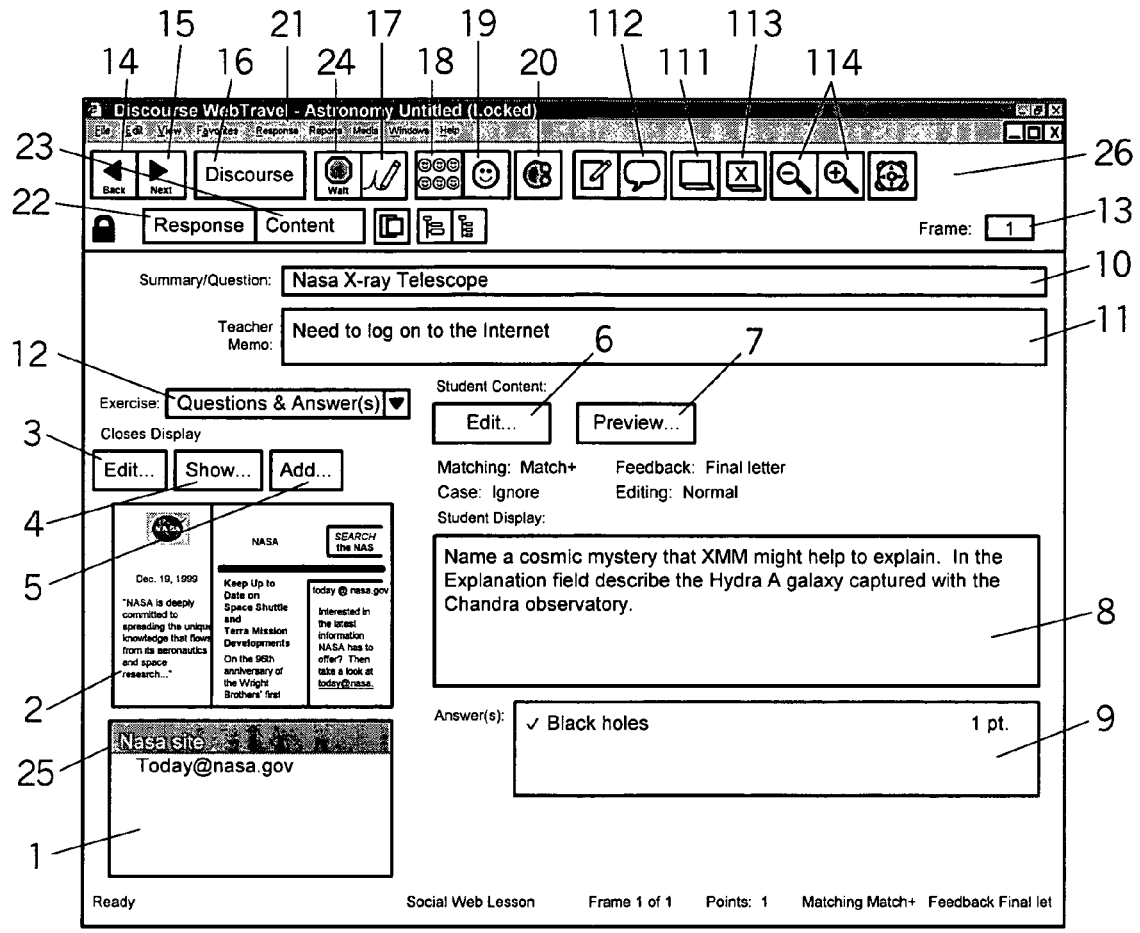
FIG. 1 is a window screen display of a Q&A exercise relating to a NASA Web site page.

FIG. 1 shows the screen display, also referred to as a "Content" screen of a Q&A exercise relating to a NASA Web site, as it appears on the teacher's computer. The type of exercise to be authored, whether it is Q&A or fill-in-the-blanks or multiple choice or open-ended, is selected via the drop-down list box 12. The titles of one or more Web site pages, relating to the Q&A exercise, appear in list box 1. When selecting one of these titles by clicking on it, a thumbnail preview of the Web site page appears in display box 2, even when the system is offline, without necessarily contemporaneously communicating with the original Web site, as will be explained with reference to FIG. 4.

The question to be asked concerning the highlighted Web site 25, together with a possible graphic illustration which may be considered as being part of the question, is shown in "Student Display" display box 8 in FIG. 1. One or more of the desired answers to the question, are shown in the "Answer" text box 9. In the present example the desired answer is "Black holes."

Figure 8:
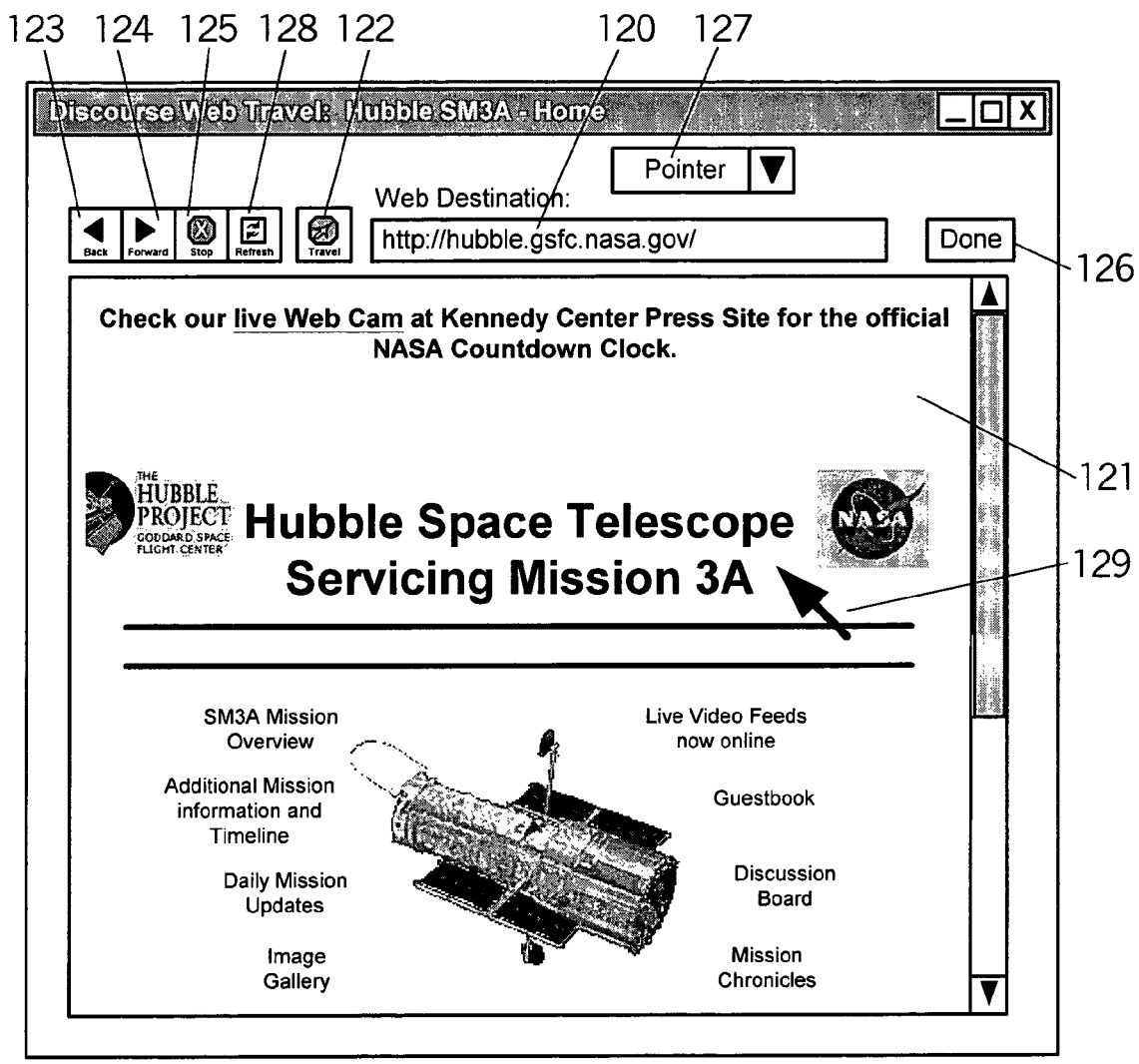
FIG. 8 is a screen display seen on the teacher Is computer for spontaneous teacher-led group browsing.

To author or edit the titles of the Web site pages in display 1, the "Edit" button 3, "Show" button 4, and "Add" button 5 are used. Thus, actuating "Edit" button 3 opens the window shown in FIG. 3 allowing modification of the Web titles. Actuating the "Show" button 4 causes the Web page of the highlighted title 25 to appear on the teacher's screen (as shown in FIG. 8) and at the same time publishes this Web page on all the student computers. Clicking on the "Add" button 5 permits the adding of new Web site titles in text box 1 by opening the window of FIG. 2, which shows a list of Web sites from the World Wide Web. One can also add Web pages stored in the local file system as will be explained with reference to FIG. 2.

The second "Edit" button 6 seen in FIG. 1 is used to author or edit the contents of the "Student Display" display box 8 or the answers in the "Answer" text box 9. This opens the edit window shown in FIG. 5.

Further in FIG. 1, the "Summary/Question" text box 10 shows the title of the exercise, which in the present example is "Nasa X-Ray Telescope." A "Teacher Memo" text box 11 is used in the present case to remind the teacher that the system must be logged onto the Internet. The exercise (or Frame) number of the lesson is shown in text box 13.

The toolbar 26 at the top of the window in FIG. 1 controls the use of the lesson. Thus, button 17 enables the students to log on. Buttons 18 and 19 determine whether the class of students who are logged on to the lesson, will work in Social or in Self-paced modes, respectively. Buttons 14 and 15 enable access to the "Previous" and "Next" exercises of the lesson.

Figure 6:
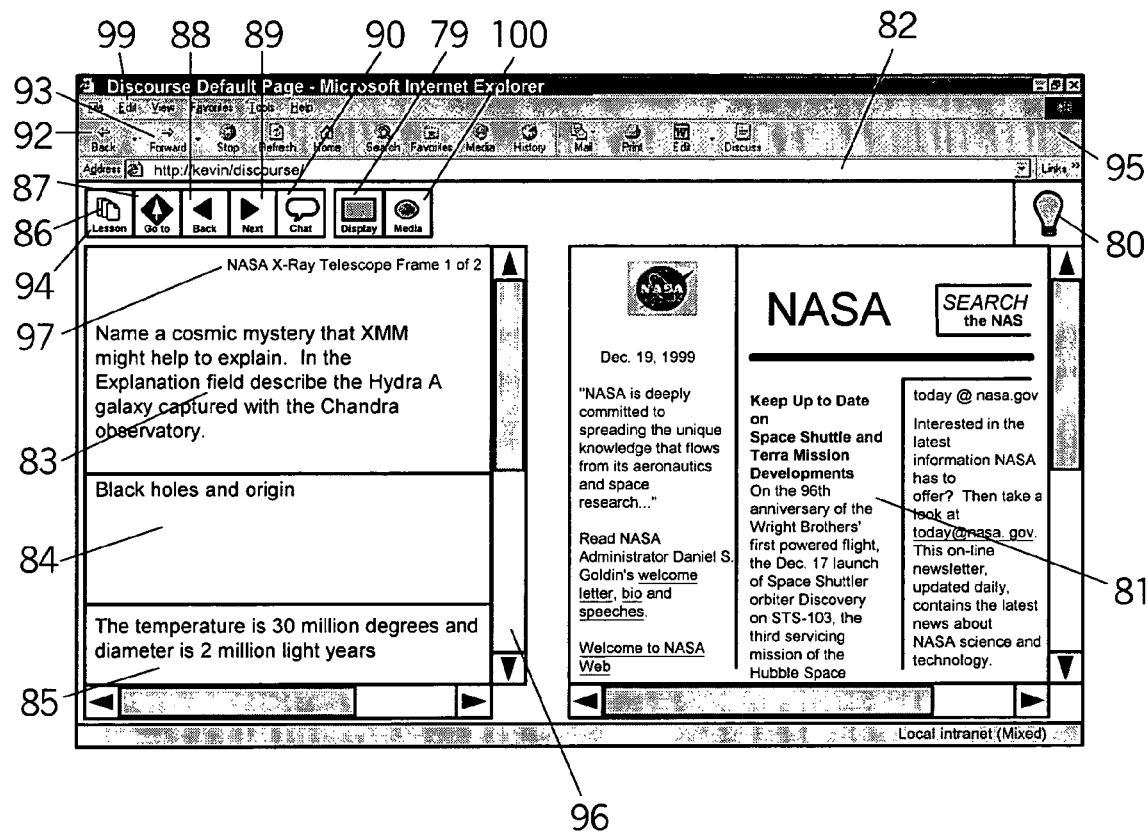
FIG. 6 is an exercise window screen display including a Web site page as seen on the screen of a student's computer.

Button 16, referred to as the "Please Answer" or "Discourse" button, is used in Social mode by the teacher to publish exercises to the plurality of students logged on to the same lesson as the teacher. The exercises include the highlighted Web site 25, together with the question and other "Student Display" information from display box 8. These two components of an exercise preferably appear on the student screens in separate panes in one window as shown in FIG. 6. In contrast, the "Show" button 4 publishes only the highlighted Web site 25.

The "Wait" button 24 publishes the message "Please Wait" on each student screen and at the same time locks the student computer, by not providing an "Answer" text box. This effectively blocks access to the response server.

A "Web Travel" button 20 is used to browse the Web and allow the students to see the different Web pages on their screens at the same time, as explained with reference to FIG. 8. "Chat" button 112, "Publish" button 111, "Clear" button 113 and "Shrink" and "Magnify" buttons 114 are described with reference to FIG. 7.

Figure 2:
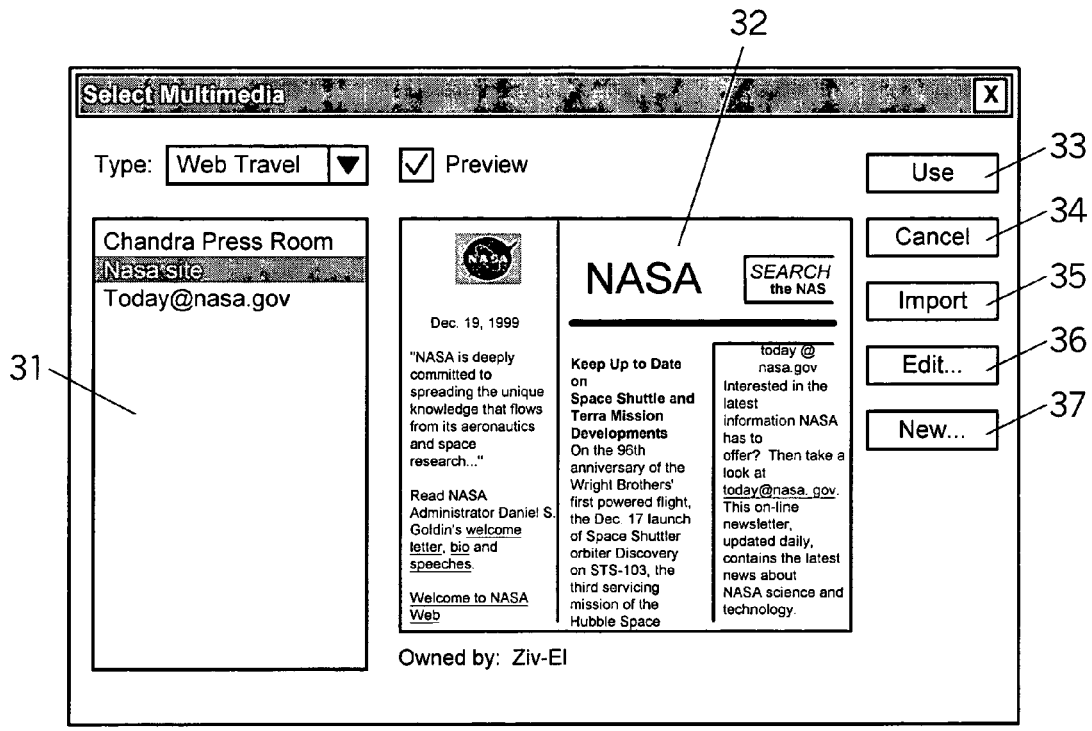
FIG. 2 is a window screen display for incorporating Web pages in an exercise.

FIG. 2 is a window displayed as a result of actuating the "Add" button 5 in FIG. 1. This window shows Web site titles in list box 31 which are available for incorporation in an exercise. A Web page display box 32 shows a thumbnail preview of the Web site or Web page currently highlighted, without contemporaneously communicating with the original Web site, as will be explained with reference to FIG. 4. After highlighting a title in list box 31 in FIG. 2 and actuating the "Use" button 33, the title is transferred to text box 1 of FIG. 1. Actuating the "Edit" button 36 in FIG. 2, allows modification of the details relating to the highlighted Web site title using the "Edit" window shown in FIG. 3.

Figure 3:
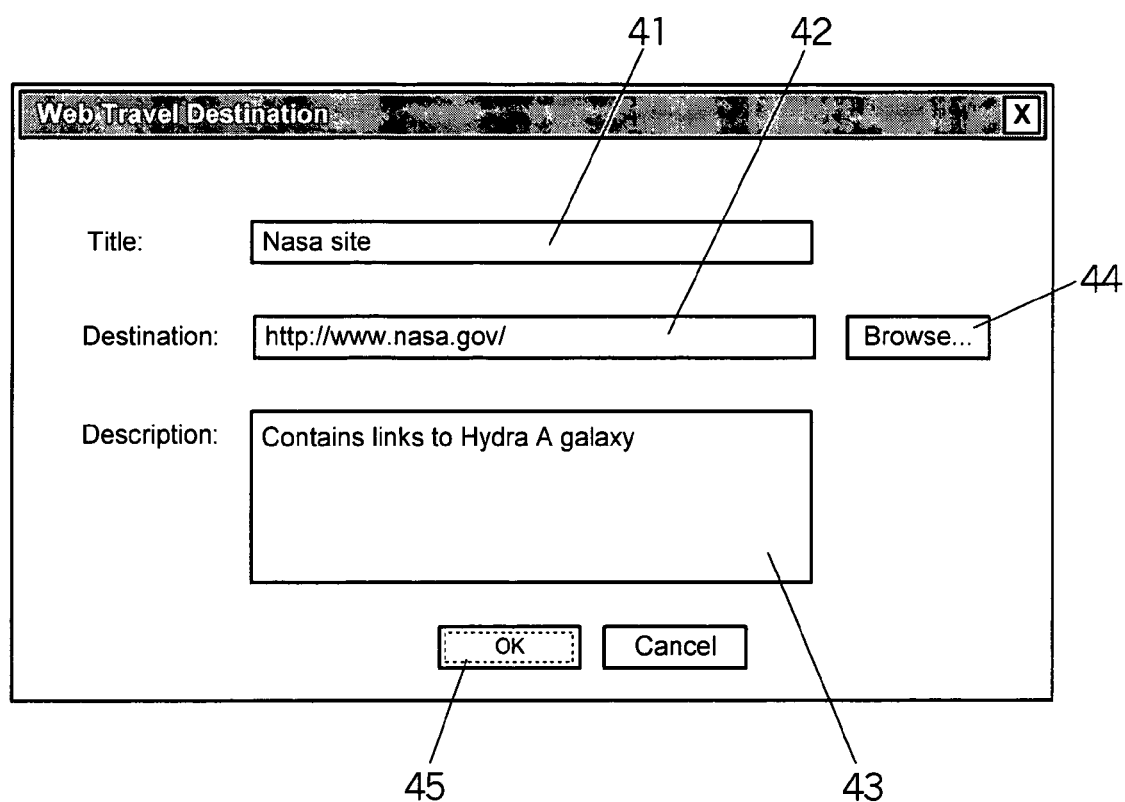
FIG. 3 is an edit window screen display for incorporating a URL of a desired Web page in an exercise.

Actuating the "Import" button 35 in FIG. 2 allows the import of Web pages from a local file system by opening a standard file selection window. The same or a second file selection window may be opened to specify the directory containing supporting materials such as images, sound and Java Script. After the teacher selects "OK" on the file selection window, the window of FIG. 3 appears. The teacher may now change the title data in the "Title" text box 41 and description data in "Description" text box 43 in FIG. 3. The URL in "Destination" text box 42 in FIG. 3 is automatically generated and filled in by the software based on the file system of the Web server that was set by the software on import. The URL text box 42 is grayed out to prevent changing it. The teacher then actuates the "OK" button 45 in FIG. 3, which results in the thumbnail picture and title appearing in FIG. 2, and the imported Web page is stored on data server 148 of FIG. 10. The teacher then actuates the "Use" button 33 in FIG. 2 and the title data appears in text box 1 of FIG. 1.

Figure 10:
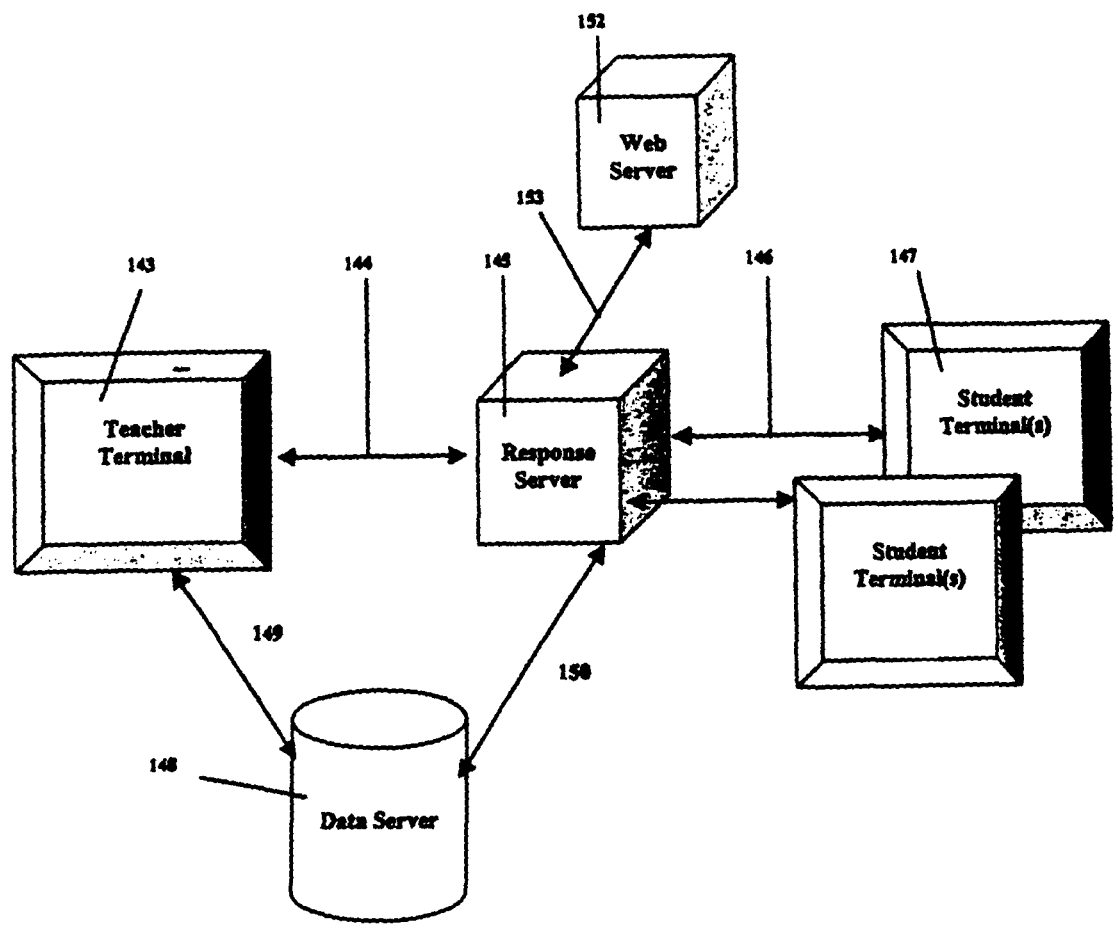
FIG. 10 is a block diagram of the system of the present invention.

When the Teacher actuates the "Discourse" button 16 of FIG. 1 to publish the exercise, the imported Web page is automatically transferred from data server 148 of FIG. 10 to the appropriate location on Web server 152 that corresponds to the URL generated earlier and is accessible by the Web browser on the student computers.

Figure 4:
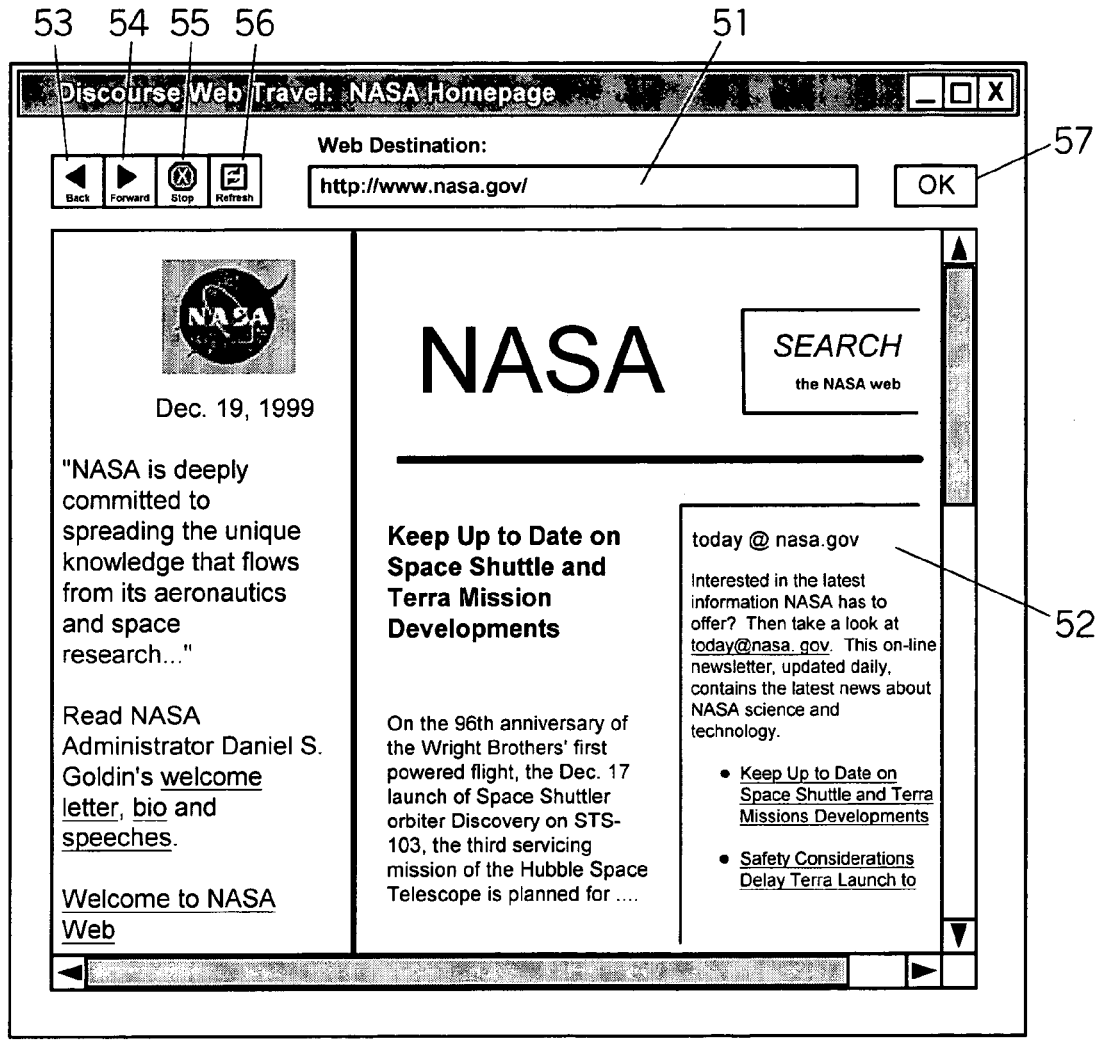
FIG. 4 is a browser window screen display for viewing a Web page with its associated URL.

FIG. 3 is an edit window for a desired Web page. If it is already filled in, as for example when "Edit" button 3 in FIG. 1 is actuated, the various text boxes can be edited, after which the "OK" button 45 is actuated. If it is empty as when the "New" button 37 in FIG. 2 is actuated, a suitable title can be filled in, in the "Title" text box 41 and a URL filled in, in the "Destination" text box 42. A short description of the Web page, for the teacher's own benefit, may be filled in, in text box 43. The "Browse" button 44 in FIG. 3 permits viewing of the Web page, whose URL is shown in "Destination" text box 42, as seen in FIG. 4. Actuating the "OK" button 45 transfers the information from text box 41 to text box 31 in FIG. 2.

FIG. 4 shows a browser window resulting from actuating "Browse" button 44 in FIG. 3, which also causes the URL in "Destination" text box 42 in FIG. 3 to be transferred to the "Destination" text box 51 in FIG. 4. Now, in the known manner of browser operation, any URL can be typed into text box 51 and executing the "Enter" command displays the Web page in text box 52 from the Internet, Intranet, or local file system. Selecting a link on the page changes the URL and displays a new page. The "Back" and "Forward" buttons 53 and 54 allow navigating between different pages already opened by browsing. "Stop" button 55 interrupts the retrieval of a page and "Refresh" button 56 refreshes a page in the known manner.

Whenever it is desired to include a Web page in an exercise, the "OK" button 57 in FIG. 4 is actuated. This saves an image of the Web page, which is stored, together with the URL from "Web Destination" text box 51, with the other data of the current exercise in the database in server 148 (FIG. 10). Clicking on the "OK" button 57 also closes the window of FIG. 4 and the URL in the "Destination" text box 42 in FIG. 3 is updated with the information from text box 51 of FIG. 4. It is the saved image of the Web page, which allows the display of the thumbnail or preview image in display box 2 of FIG. 1, even when the system is working off-line.

Figure 5:
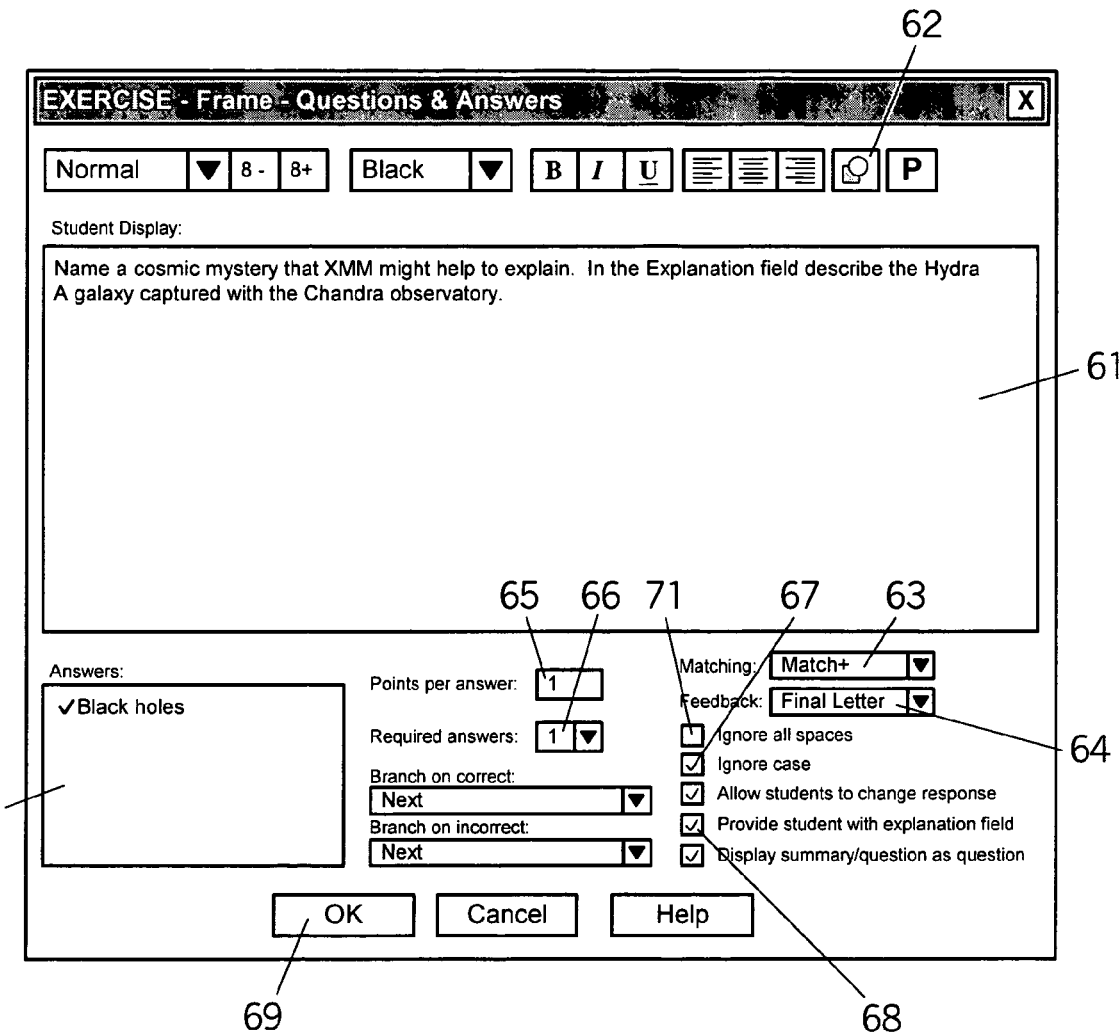
FIG. 5 is a dialog box screen display for enabling the teacher to edit a Q&A exercise including a Web page.

FIG. 5 is displayed as a result of actuating the "Edit" button 6 in FIG. 1. FIG. 5 shows an edit window for that part of the Q&A exercise, which accompanies the Web page. Descriptive text including the question relating to the accompanying Web page, if any, is typed into "Student Display" display box 61. Button 62 may be used to add a graphic image into display box 61 to supplement the text, by opening a dialog window showing a list of graphic image files already present in a folder in the local file system, or by importing a graphic image file from an external source. One or more answers to the question are typed in the "Answer" text box 70. The required number of answers from the student is selected from the drop-down list box 66 which, in the present example, is one, since only one answer is requested which is "Black holes," as can be seen in "Answer" text box 70. The point score to be allocated for a correct response is typed into text box 65.

Drop-down list box 63 indicates the type of matching or evaluation, which is to be applied to a student's response. For example, if the "Identical" mode were selected in the "Matching" mode selection box 63, it would imply exact matching, character by character, of the student's response with the teacher's answer shown in text box 70. If the "Keyword" mode were to appear in box 63, it would imply matching a word in a sentence response with the teacher's answer. In the present example Match+ is shown in "Matching" mode selection box 63, implying that the student response must start with "Black holes" as specified in box 70 but can have additional words or characters thereafter (e.g. "Black holes and origin," as in text box 84 in FIG. 6). "Matching" implies homologous comparison of a character in the teacher's answer with each character in the whole or part of the response according to the matching mode, as well as evaluation of right or wrong by the allocation of a score according to the correctness of the response.

Drop-down list box 64 indicates the type of feedback, for example, "Every Letter" or "Final Letter," or "None" to be supplied to the student as a result of the matching. The feedback may be in the form of a flashing lamp icon, as explained with reference to FIG. 6.

Several check boxes are provided in FIG. 5 to further refine the type of response desired from the student. Thus, check box 67 specifies that the case used by the student (upper or lower case) is not important. Check box 71 specifies that the use of spaces in the response is important. Check box 68 specifies, that in addition to an "Answer" text box for the student to respond in, a separate "Explanation" text box (85 in FIG. 6) must be provided to enable the student to give an explanation for the response given. When editing is completed, the "OK" button 69 in FIG. 5 is executed.

The present invention further provides for the exercise to appear on the screen of a student computer in at least two portions, preferably within one window, where the Web page retrieved via the URL appears in one pane and the rest of the exercise in the remainder of the window. (A "Pane" is elsewhere often referred to as "frame", but the latter is avoided here as Frame is used here to designate a unit within a lesson). Furthermore, in addition to a "Response" data text box, a separate explanation text box may also appear on the student computer screen, depending on the exercise, as illustrated in FIG. 6.

FIG. 6 shows the screen on a student computer when either the teacher executes the "Please Answer" button 16 in FIG. 1 (while "Social Mode" button 18 in FIG. 1 is executed), or the student requests the exercise, (in Self-paced mode when button 19 in FIG. 1 is executed) as will be explained. There are shown two main panes which scroll independently within one window. The Web page retrieved via the URL appears in one pane on the right, and the rest of the exercise, as well as the "Response" text box 84 appears on the left.

In FIG. 6, the URL received from the student appears in the "Address" text box 82 and the related Web page, including links, appears in display box 81 within its own pane. In the present Q&A exercise, the text, question and graphic image, if any, authored in the "Student Display" text box 8 in FIG. 1, appear in display box 83. At the top of display box 83, marked 97, is written "Nasa X-Ray Telescope. Frame 1 of 2". This phrase is constructed from the title of the exercise as it appears in "Summary" text box 10 in FIG. 1 and the fact that this is Exercise 1 (or Frame 1) out of a total of 2 exercises. The "Response" text box 84 in FIG. 6 is provided for the student to respond in. The "Explanation" text box 85 scrolls and is provided to allow for a long explanation by the student for the response in text box 84. In the present example, the student response in text box 84 is "Black holes and origin" and the explanation in text box 85 is "The temperature is 30 million degrees . . .".

In the case where video conferencing facilities are added, the window shown in FIG. 6 is rearranged to show the added picture of the teacher, or the video picture is superimposed as a window. In the present invention one can teach with or without video and/or audio.

When the correct response by a student is entered into the "Response" text box 84, the icon in the form of lamp 80 lights up in different ways. In the present case the "Feedback" mode is "Final Letter." This implies that lamp 80 is turned off but flashes when the student reaches the last character of the authored correct response, which is "s" in "Black holes." On the other hand, if the "Feedback" mode were "Every Letter" the lamp 80 would stay on with each correct keystroke and would then flash on the last character of the authored response. The lamp icon is "extinguished" when the student makes an error, that is, when the student types a wrong character.

Every keystroke of a student's response in text box 84 in FIG. 6, and from the "Explanation" text box 85, is immediately transmitted to the teacher's computer in an applet, character-by-character. Should the student click on a link in text box 81, the URL in text box 82 changes and is transmitted as a whole in a packet to the teacher's computer and appears in column 107 of FIG. 7 as will be explained, while a new Web page appears to replace the current one in display box 81 of FIG. 6.

The top toolbar 95 in FIG. 6 is part of the Web browser user interface and relates to the Web page and its links. The lower toolbar 94 relates to the exercise as a whole and how to access other lessons. The top toolbar contains standard browser icons such as the "Back" button and the "Forward" buttons 92 and 93, which allow returning to pages already browsed.

In the lower toolbar the "Go To" button 87 permits the student to choose which exercise number to work on in the case where the student is working in Self-paced Mode. The "Back" and "Next" buttons 88 and 89 enable the student to go to the previous and next exercise respectively in Self-paced Mode. The "Chat" button 90 superimposes a window on the window of FIG. 6 to start a chat session with the teacher, and is not intended to be part of the response to the question in display box 83. The teacher can inhibit this chat action by selecting a "No Chat" option on the Response 21 pull-down menu in FIG. 1.

"Lesson" button 86 lists all the lessons available to the student when logging onto the system. "Media" Button 100 restores the Web page 81, if the teacher replaces it with other information, for example, if the teacher should publish selected responses of other students, as will be explained with reference to FIG. 7. "Display" button 79, cancels "Media" button 100, and brings back the selected responses.

Figure 7:
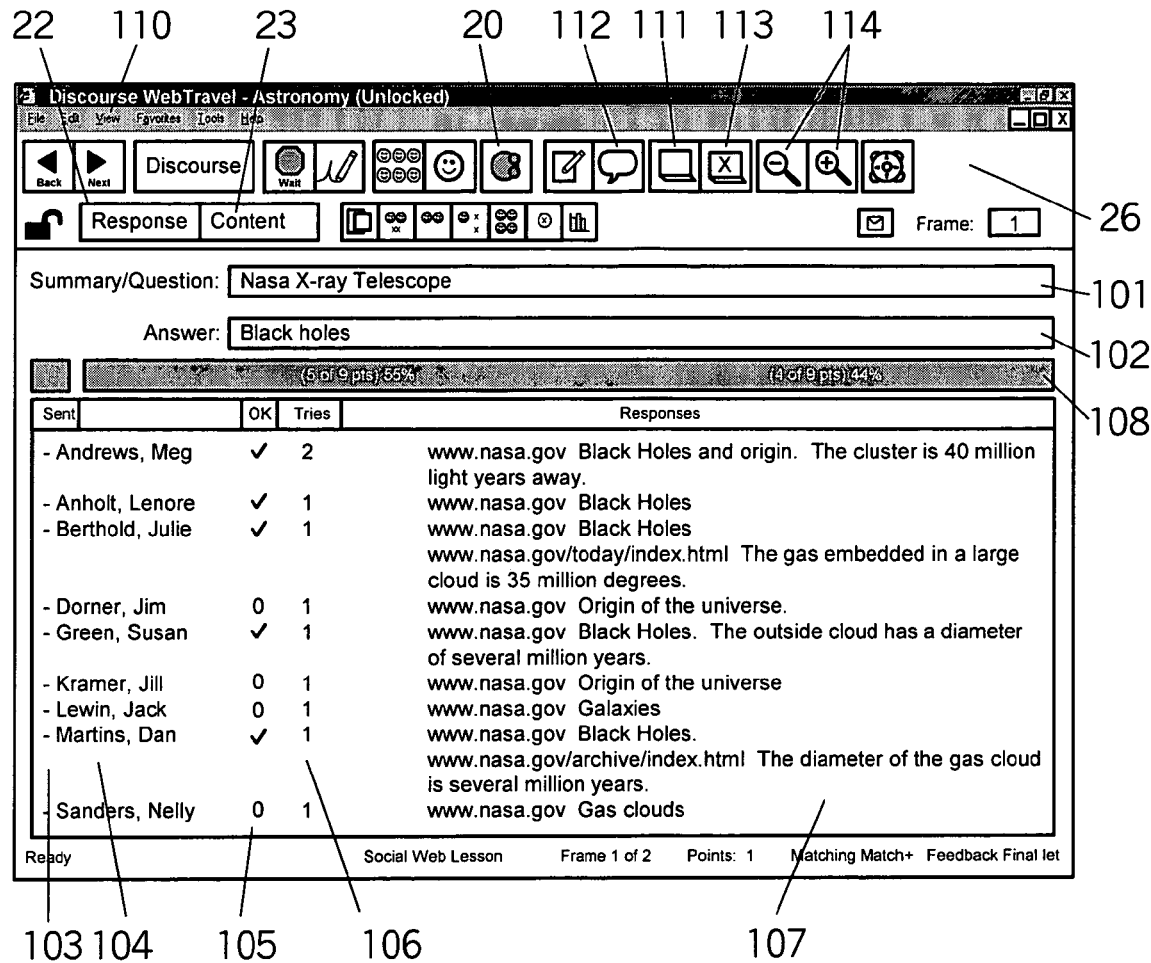
FIG. 7 is a response window screen display of the students' responses seen on a screen of the teacher's computer.

FIG. 7 shows the students' responses on the Response screen of the teacher's computer. The toolbar 26 is the same as in FIG. 1. The "Magnify" and "Shrink" buttons 114 change the font size of the responses, so as to adjust the number of student responses which appear on the screen. The buttons in the row below include the "Content" button 23, which has to be executed to obtain the Content screen shown in FIG. 1, and the "Response" button 22, which is executed in order to obtain the Response screen shown in FIG. 7. The "Summary" text box 101 and the "Answer" text box 102 correspond to the text boxes 10 and 9 in FIG. 1, respectively. A "Chat" button 112 is also provided for initiating a personal chat with a student. The "Web Travel" button 20 corresponds to the same button in FIG. 1.

A seat number in column 103 can be assigned to each student in column 104 but, in the present example, this feature is not used. Column 107 shows the students' responses, preceded by the current URL from text box 82 of FIG. 6, and followed by the explanation field from text box 85 in FIG. 6. The inclusion of the URL and explanation are optional and set by the "View" pull-down menu 110 in the top menu bar. If a response is correct it appears in green and if it is wrong it appears in red. If it is an open-ended response, it will usually appear in black. All responses which start with "Black holes", are green even if they are followed by other words because the "Matching" mode is Match+ as explained with reference to field 63 of FIG. 5. The "OK" column 105 in FIG. 7 shows the score for each response as a result of the comparison and evaluation procedure, or a tick mark if full points have been scored. The "Tries" column 106 shows how many tries each student made in answering the question.

If the teacher wants to see the actual Web site used by a student, in column 107 in FIG. 7, the teacher double clicks on this URL and then clicks "Web Travel" button 20. This displays FIG. 8, with text box 120 filled in with this URL. The Web site can now be shown to the other students by actuating the "Travel" button 122 in FIG. 8. The is easily recognizable in column 107 in FIG. 7, because it starts at the beginning of a line. (The URL arrives in a packet from the student's computer. This is in contrast to the actual response, which usually arrives one character at a time depending on the speed of typing, the number of students and the speed of the system).

If the teacher wants other students to see the responses of particular students with or without their names, the teacher highlights the names or responses, respectively, of the particular students and executes the "Publish" button 111. This causes the responses to be published on each student's screen, or optionally on a large television screen called a Class Display, or optionally on each student's screen, or on both, at the teacher's discretion and depending on whether the students are present in the classroom or are taught remotely. The options are also available on the "View" drop-down menu 110. These responses can then be used for written or verbal discussion by the whole class. For the Class Display, a screen capture memory device can be used, such as the Averkey 3 so that the information remains static on the Class Display, while that on the teacher's screen can change. Operating the "Clear" button 113 erases the images on the student screens and on the Class Display.

By clicking on a point in the "OK" column opposite student's name in FIG. 7 such as that of student Jim Dorner, a drop-down list appears which allows the score of the student Dorner to be modified from "0" to maximum points. If maximum points are allocated, the response turns green. Also, if the "Feedback" selection mode in drop-down list box 64 in FIG. 5 is "Final Letter," student Jim Dorner's lamp 80 in FIG. 6 will flash. Finally, this type of online scoring "cascades", meaning that all similar student responses, i.e. "Origin of the Universe," such as Jill Kramer's, are automatically treated in the same way as Jim Dorner's response. In other words, a programmed response (i.e. "Black Holes" in text box 9 in FIG. 1) is scored automatically while unanticipated responses like "Origin of the Universe" are capable of being scored by the teacher online.

The performance bar 108 in FIG. 7 is multi-colored and shows the aggregate of the students' performance on a particular exercise. Thus, the green part shows the percentage of the students in the class who have given the correct response and the red part shows the percentage incorrect. If some students have not yet answered, the percentage of these students appears in blue.

FIG. 8 shows the teacher's screen for teacher-led, group Web browsing. If an exercise has an associated Web page, then when the teacher executes "Web Travel" button 20 in FIG. 1, the associated Web page is displayed as shown in display box 121 in FIG. 8. If there is no associated Web page, then actuating the "Web Travel" button 20 in FIG. 1, shows a blank display box 121 in FIG. 8, so that the teacher has to type in the URL in text box 120 in order for the Web page to appear in display box 121. Executing the "Travel" button 122 publishes the Web page on the screens of all the students. If the teacher clicks on a link in display box 121 while the "Travel" button 122 is executed, the page of the linked site is displayed on the teacher's and students' screens.

Buttons 123 and 124 are the "Back" and "Forward" buttons for seeing Web pages previously viewed. The "Stop" button 125 interrupts transmission of information from a Web site. The "Refresh" button 128 refreshes the screen. The "Done" button 126 closes the window.

Should the teacher want the students to respond to a spontaneous verbal question relating to a specific URL, the teacher asks the question verbally, then executes the Please "Answer" button 16 in FIG. 1, followed by actuating the "Web Travel" button 122 and entering the URL in the "Web Destination" text box 120 in FIG. 8 (unless it has been entered previously), and actuating the "Travel" button 122. The students then receive a screen similar to that of FIG. 6, with the text in text box 83 only saying "My Answer is:". The student then responds in text box 84 of FIG. 6.

The drop-down list box 127 in FIG. 8 presents various teacher exposition options, including Indicator tools, as explained with reference to FIGS. 9A and 9B.

The following description explains how the present invention enables a teacher to point out with a pointer to one or more students, or for a student to be able to point out to the teacher or to other students, or to markup an item on a Web page on the teacher's and students' screens. "Markup" includes creating and moving objects such as freehand drawings, lines, shapes, images, and typed text, overlaid on a Web page. These objects are able to be saved in combination with the Web page.

Figure 9A:
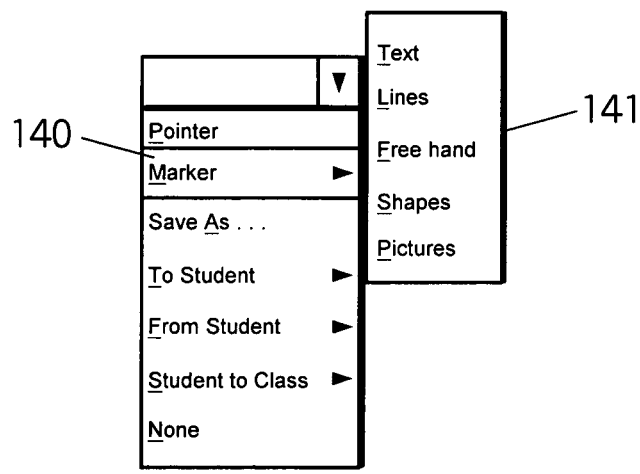
FIGS. 9A and 9B are a two-tier menu screen displays with second tier menus showing various options under one command in the first tier menu.

FIG. 9A shows the basic options menu 140, which includes menu commands such as "Pointer," "Marker," "Save As . . . ", "To Student," "From Student," "Student to Class" and "None". On selecting "Pointer" the window of FIG. 9A closes and a large pointer 129 appears on the Web page of the teacher's screen as shown in FIG. 8, instead of the regular mouse pointer. At the same time a pointer appears on each of the student screens, which follows the movements of the teacher's pointer in synchronism. This pointer can be a stylus or other screen-pointing device.

On selecting "Marker" in FIG. 9A, a second tier menu 141 appears with menu commands for typing text ("Text" command), drawing lines ("Lines" command), free hand drawing ("Free hand" command), drawing shapes ("Shapes" command) and importing picture images ("Picture" command) to appear on top of the Web page. On selecting "Text," "Lines" or "Shapes" in menu 141 and clicking at the point on the Web page where these are to be inserted, the objects appear at that point with the help of a user interface analogous to clicking on a text box, line or "AutoShape" icon respectively, on the "Drawing" toolbar of a MICROSOFT WORD 97 document. Also when selecting "Picture" in FIG. 9A, the image is inserted using an user interface similar to the dialog presented by executing the "Insert Picture" command in MICROSOFT WORD 97. The "Indicators," such as "Pointer" and "Marker," for indicating on the teacher's screen, are copied to the same positions on the corresponding Web pages on the student screens if the "Travel" button 122 is executed. If the "Travel" button 122 is not executed, transfer occurs to a particular student as explained with reference to FIG. 9B.

At the student computers 147 in FIG. 10, the more important functions of "Pointer," "Text" and "Free hand," are implemented by commands appearing under the "Edit" pull-down menu 99 in FIG. 6.

Figure 9B:
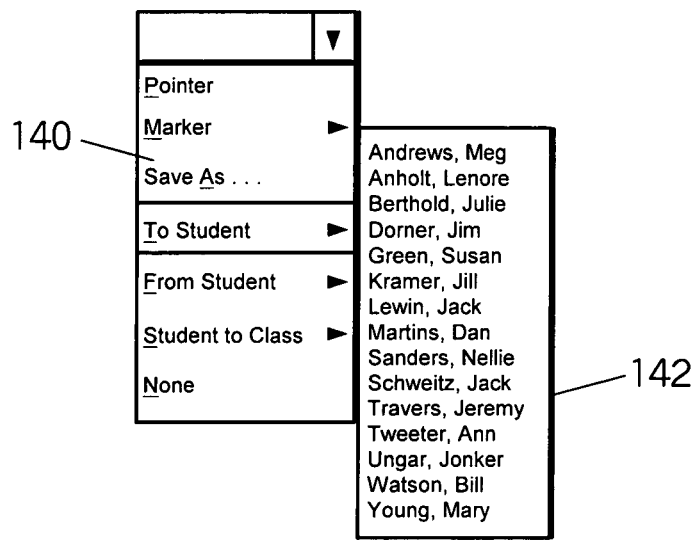

If the teacher should select one of the three menu options "To Student," "From Student" or "Student to Class" in menu 140, the student list 142 in FIG. 9B appears, and the "Travel" button 122 in FIG. 8 is cancelled. Selecting "To Student" and thereafter the name of a particular student, causes the pointer or marker previously selected to appear on the screen of that particular student. Selecting "From Student" and thereafter the name of a student, allows that student to cause a pointer or marker on the student's screen to appear on the teacher's screen, but not on the screens of the other students. Selecting "Student to Class" and thereafter the name of a student, allows that student to cause a pointer or marker on the student's screen to also appear on the teacher's screen as well as on the screens of all the students. The teacher cancels the options of menu 140 by the use of the "Escape" key or closes menu 140 by clicking on "None."

The preferred system implementation for inserting the pointer and marker both locally by the teacher or student and have them displayed at other computers, is to have at least one transparent drawing plane above the Web browser component both at the teacher and at the student end. At the student end a Plug-in, JAVA or ACTIVE X Browser component is added. The "Pointer" or drawing commands associated with the "Marker" command options, are implemented locally at the teacher or student end, (depending on who initiates it) and the drawing commands are sent through the Intranet or Internet to enable execution in the plane above the browser on the screen(s) to which it is intended. The execution of the "Pointer" and "Free hand" commands is further explained with reference to FIG. 10.

In an alternative embodiment of the present invention, instead of using a transparent drawing plane, one can use a separate transparent window, which is kicked and floats above a separate browser application, as is familiar to those conversant with WINDOWS applications and Internet browsers.

The "Save As" option in FIG. 9A allows saving of the objects, inserted via list 141, on the drawing plane together with the Web page, for future reloading as a graphic display.

FIG. 10 shows an overall block diagram of the system. The overall system comprises a response server 145, a data server 148, a Web server 152, a teacher's computer 143 and a multiplicity of student computers 147 in an Intranet or Internet or combined configuration. The interconnections are schematically represented by 144, 153, 146, 149, 150, 160 and 161. The teacher's computer 143, response server 145, data server 148 and Web server 152, may or may not be located on the same computer. In the case where students are in the same room with the teacher, a Class Display monitor 171 can be attached (using lines 173 and 174) to the teacher's computer 143 by the use of a screen memory capture device 170, or by the use of a teacher's computer 143 with dual monitors and adding program instructions and video memory to the teacher's computer 143, that enables the freezing of the image on the Class Display 143.

In general, the main application program on the teacher's computer 143 can have a variety of communication applications and protocols including browser software, TCP/IP (Transfer Control Protocol/Internet Protocol) socket communication and ODBC (Open Database Connectivity). The interconnections 160 and 161, between the Web server 152 and the teacher's computer 143 and student computers 147, respectively, represent standard browser connections mainly used for accessing Web pages on the World Wide Web. The data server 148, which maintains contact with the response server 145 and the teacher's computer 143 through an ODBC connection, is used to store the database including lesson data and response data from students such as the actual responses and the scores. During a lesson, the data server 148 is dynamically maintained by the response server 145. For convenient communication on the Internet, the response server 145 program is written in C++ and the student computer 147 program is written in the JAVA language.

When a student logs on, HTML pages containing JAVA applets are loaded by the student computer 147 from the Web server 152, containing the common parameters and layout of a student user interface, including the various buttons 94 in FIG. 6. One or more of these applets establishes TCP Socket communication 146 directly with the response server 145. Multiple teacher computers can be attached to the same system with different groups of students defining different classes, by virtue of a relational table set up at the time of registration. Also additional commuters with limited functionality and access can be attached to the system, for example, to allow a parent to check on the performance of a student by inspecting restricted data in the database via the Web server 152, response server 145 and data server 148.

When an actual lesson starts, the lesson data is placed on the response server 145. When the teacher executes the "Please Answer" button 16 in FIG. 1, usually in Social Mode, the URL of the response server together with the URL of the Web site (such as 120 in FIG. 8) for a particular exercise is sent to the student computers 147 together with the exercise number, from text box 13 in FIG. 1. Alternatively, in Self-paced mode the student requests a particular exercise by supplying the exercise number. The lesson data from the response server 145 is placed in HTML format on Web server 152 and sent to the student in HTTP protocol, thereby also transferring any embedded links, as is known to those skilled in the art of the use of Internet browsers.

With every type of exercise, the student receives the data and an applet pertaining to the particular screen layout pertinent to the exercise type, for example, in a fill-in-the-blanks exercise, the layout of the text and blanks to be filled in. This is referred to as the "Question" applet. Normally, the "Question" applet communicates with the response server via the Socket connection already established by the "Toolbar" applet. Alternatively, the "Question" applet can establish direct socket communication 146 with the response server 145. With every student keystroke, the student computer 147 sends a packet to the response server 145 using this socket 146.

The student response is compared and evaluated by the comparison and evaluation logic stored in the response server 145 in FIG. 10. This logic compares the authored answer in text box 70 in FIG. 5, with each student response, character-by-character, and the authored score from text box 65 in FIG. 5 is consequently awarded as indicated in the OK column 105 in FIG. 7.

Alternatively, the student response could be compared and evaluated by comparison and evaluation logic at the student computer 147 in FIG. 10, if the response server 145 supplies the student computer 147 with the comparison and evaluation logic and criteria.

Depending on the Matching mode selection 63 in FIG. 5, between the student response and the authored answer, and on the Feedback mode selection 64 in FIG. 5, prescribed by the exercise and as interpreted by the program in the response server 145, a feedback signal is sent to the toolbar 94 (FIG. 6) on student computer 147 as a message via the "Toolbar" applet. This causes the lamp 80 in FIG. 6 to light up, flicker or extinguish according to the correctness of the response. At the same time each student response of a particular class, is sent from the response server 145, to the teacher's computer 143, as it is formed character-by-character, for display on the teacher's screen in different colors according to the correctness of the response, as described with reference to FIG. 7. Depending on the size of the font on the screen, typically at least sixteen responses may be visible at the same time.

The displaying of responses of particular students on all the student screens, mentioned with reference to FIG. 7, is achieved by the teacher's computer 143 of FIG. 10 sending a command to the response server 145 over the socket connection 144. The response server 145 retrieves the response from the data server 148 and makes it accessible to the students as a Web page. The response server 145 then sends a command to is every student computer 147 over socket connections 146. The student computers 147 then load the response as a Web page for viewing by the students.

When executing the "Pointer" or "Free hand" commands explained with reference to FIG. 9, the mouse movements are intercepted at short time intervals at the teacher's computer 143 of FIG. 10, in order to transmit, through socket connection 144, its position to the response server 145, which then sends them to the student computers 147 through socket connections 146. The student computer 147 then displays them at the exact location specified. Similarly, the mouse movement of a student computer 147 are intercepted and transmitted through socket 146 to the response server 145 and from there to the teacher's computer 143 and/or to the other student computers.

Figure 11:
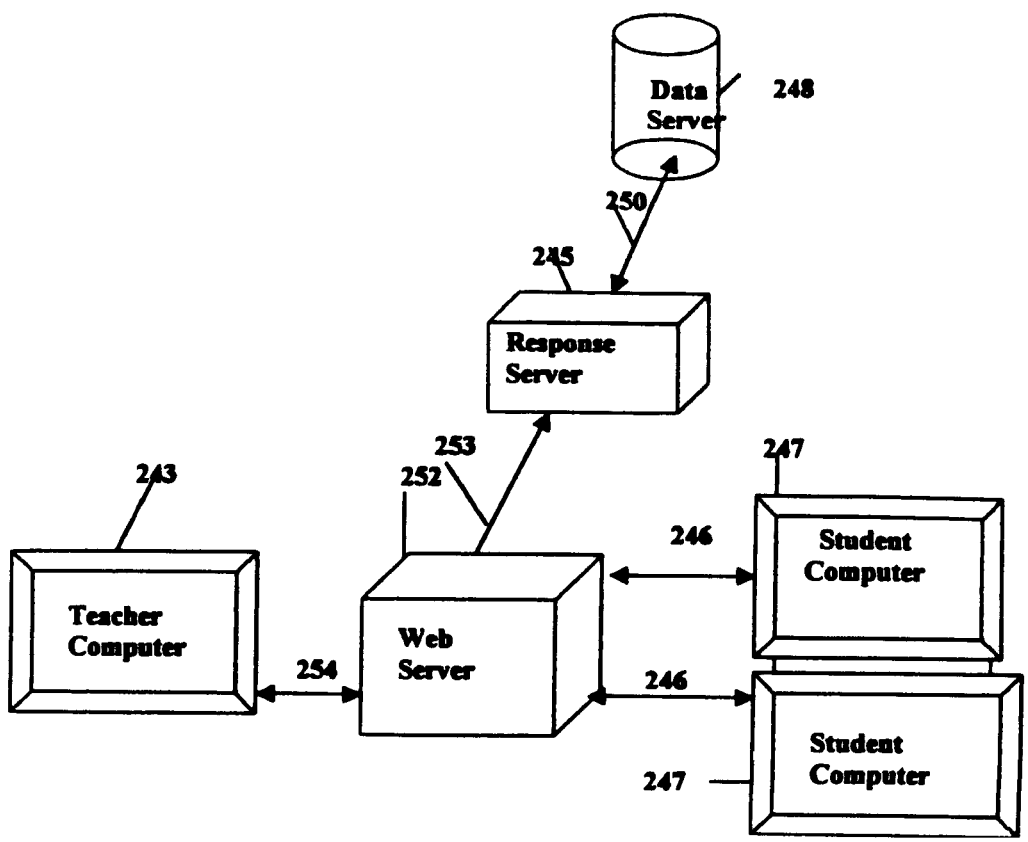
FIG. 11 is a block diagram of a system utilizing Web browsers for both the students' and the teacher's computers.

FIG. 11 shows a general block diagram of an alternative embodiment of the invention. A Class Display is not shown, but can be attached to the teacher's computer 243 as in FIG. 10. In FIG. 10 Web browsers are used for both the students' and teacher's computers instead of utilizing a specialized application program on the teacher's computer as described in FIG. 10. Typically, the Web server 252, a response server 245 and the data server 248 are located at a specially created Web site physically located remote from the student and the teacher computers, since more than one teacher can utilize the system and the students can be situated in different locations. The interconnection 254 between the Web server 252 and the teacher computer 243 comprises a Web browser connection and similarly each student computer 247 is connected via line 246 to the Web server 252 by means of a Web browser. Typically lines 246 and 254 are HTTP connections, which are standard socket connections using port 80 that has the HTTP protocol running over it. The teacher and student programs are written in the Java language, but other languages could also be used.

Web or HTTP servers are not only capable of serving up files to clients, i.e. the teachers and students, but have the ability to take data from the clients, i.e. input from keyboards and pass this information to other programs associated with the Web server, which here is the response server 245, for further processing. The response server program is written in the C++ language but could also be written in other languages.

As in FIG. 10, the student computers 247 need to communicate with the response server 245 in order to store current student responses, receive feedback signals, and retrieve past responses; as well as receive lesson frames originating from the data server 248. Also, the teacher's computer 243 needs to communicate with the response server 245 in order to display student responses and scores; as well as lesson frames originating from the data server 248. The teacher's computer 243 also needs to communicate with the response server 245 and ultimately with the data server 248, in order to store newly created lesson frames. All these communications are done in FIG. 11 via the teacher and student Web browsers and Web server 252. The other use for the Web browsers of both the teacher's computer 243 and the student computers 247 is to access Web sites on the World Wide Web.

Although reference is made in FIG. 11 to a single Web server, response server and data server, for a large number of users geographically dispersed, multiple servers can be used. Load balancing between servers at a particular Web site is achieved using techniques known to Internet Service Providers on the World Wide Web.

Figure 12:
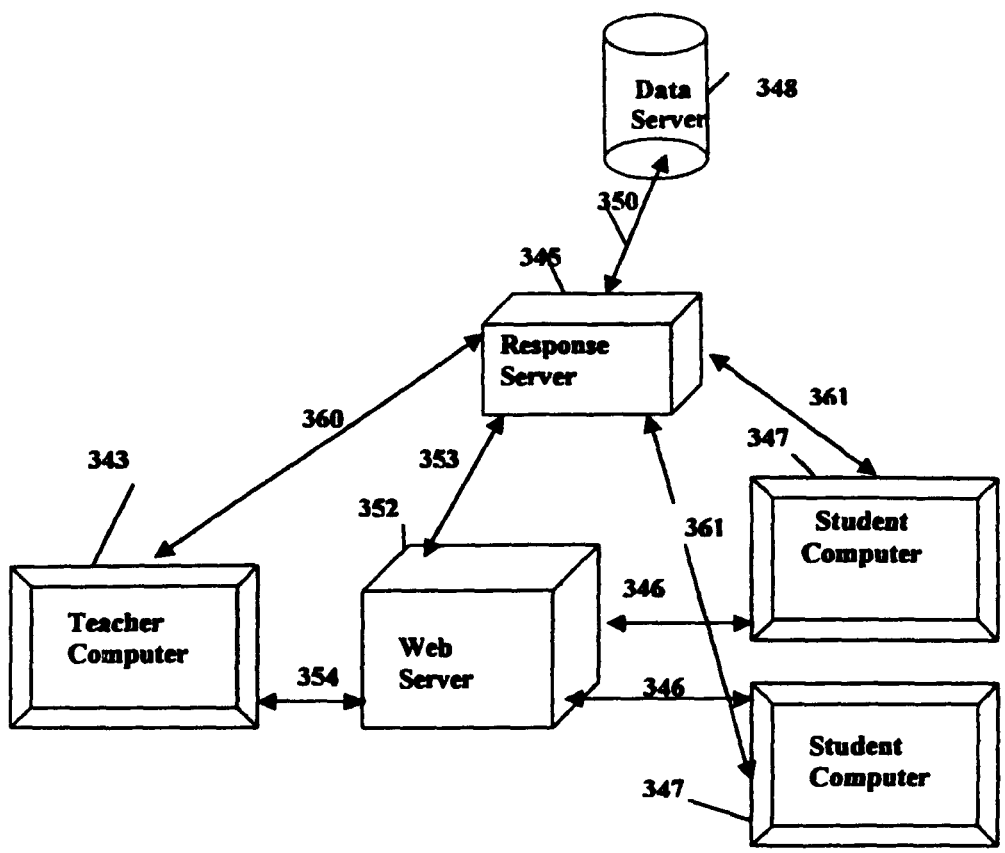
FIG. 12 shows a more particular block diagram of the system of FIG. 11.

FIG. 12 shows an alternative block diagram of the system of FIG. 11, which utilizes the Web browsers in a particular way. FIG. 12 is visually identical to FIG. 11 except for the addition of communication lines 360 and 361, between the response server 345 and the teacher's computer 343 and the student computers 347, respectively. When the teacher inserts the Web site URL on the teacher's computer 343, to access the Web site previously created for this purpose, the Web page which is received from the Web server 352 has a JAVA applet embedded in it. This JAVA applet open a socket connection between the teacher's computer 343 and the response server 345, and is represented by line 360. Similarly a applet in the Web page received by each of the student computers 347 from the Web server 352, opens a socket connection between the response server 345 and each student computer 347, and is represented by line 361.

In operation, a teacher may author a lesson or teach spontaneously without an authored lesson. To author an exercise for a lesson, which utilizes information from a Web site, the teacher first chooses the Web site by actuating the "Add" button 5 in FIG. 1, thereby opening the window of FIG. 2. If the desired Web site is not present in text box 31 of FIG. 2, "New" button 37 is actuated, which opens the window shown in FIG. 3. Unless the teacher already knows the data to be filled in FIG. 3, the teacher actuates the "Browse" button 44 and browses using FIG. 4. On actuating the "OK" button 57 in FIG. 4, the window closes, a thumbnail picture of the Web site is stored in the database and the URL is filled in text box 42 in FIG. 3. The teacher then types in the title text box 41) and description (text box 43) in FIG. 3 and executes the "OK" button 45. This results in the thumbnail picture (display box 32) and title (text box 31) respectively appearing in FIG. 2. The teacher then executes the "Use" button 33 in FIG. 2 and the title appears in text box 1 of FIG. 1.

The teacher now proceeds to fill in the rest of the exercise in FIG. 1 by actuating the "Edit" button 6; filling in the text boxes in FIG. 5 and actuating the "OK" button 69 to close the edit window and display the screen shown in FIG. 1. For a thumbnail preview of a Web site in display box 2 of FIG. 1, the teacher highlights the Title data in text box 1, and the information comes from the local database. To see a preview of what the whole exercise on the students' screens will look like, the teacher executes the "Preview" button 7.

To start teaching the teacher opens one or more lessons, or teaches without a pre-programmed lesson. Then, the teacher calls for the students to log on by actuating the "Log on" button 17 in FIG. 1, and to choose from the list of open lessons if there is more than one lesson to choose from. Next, the teacher selects whether a particular lesson will be in Social (Synchronous) Mode by operating button 18 in FIG. 1 or in Self-paced (Asynchronous) Mode by operating button 19. Next, in Social Mode the teacher selects a particular exercise number using buttons 14 or 15 or by writing the number directly into text box 13 of FIG. 1.

If the teacher wants to explain material about a particular Web site in text box 1 of FIG. 1 before presenting the students with the exercise, the teacher highlights the relevant Web site title in text box 1, (which causes a thumbnail preview in data display box 2) and executes the "Show" button 4, which sends the associated URL to the students' computers so that the students can see the Web page. At the same time the Web page appears on the teacher's screen as shown in FIG. 8, with the "Travel" button 122 actuated. The teacher can click on any link in FIG. 8 and provided "Travel" button 122 is actuated, the new Web page appears on the screens of the student computers.

To facilitate a verbal explanation, a teacher may utilize the drop-down list box 127 in FIG. 8 and use either a Pointer 129 or any of the Marker Commands 141 shown in FIG. 9A.

Should the student ask a question regarding the Web page, either verbally or via the Chat facility 90 in FIG. 6, the teacher may invite the student to use a pointer, write text or draw free-hand, by the student utilizing one of the options, "Pointer," "Text" or "Free hand", respectively, which are present in the "Edit" pull-down menu 99 in FIG. 6. However, prior to that, the teacher must decide whether the other students or only the teacher will see the student's actions. This is done by the teacher choosing between Student to Class and From Student respectively, in the menu 140 in FIG. 9B.

The teacher proceeds with the lesson in Social Mode by selecting a Web site title, if any, from display box 1 in FIG. 1 and actuating the "Please Answer" button 16. The student computers receive the URL and the "Question" applets so that all the students' screens now appear as shown in FIG. 6. The student responds to the factual part of the question in text box 84 of FIG. 6 and if requested, gives the explanation for the response in text box 85. The student can switch back and forth between data text boxes 84 and 85, without confusion between the two, since the text box the student writes in is transmitted to the response server 145, 245 or 345 in FIGS. 10, 11 and 12, respectively, together with each "Response" or "Explanation" keystroke. The correctness of a student response is continuously evaluated, character-by-character, at the response server 145, and at the same time the response appears character-by-character in real time, on the teacher's screen, in the appropriate color, as explained with reference to FIG. 7. Thus the moment a student types the last character of a correct answer, the response in FIG. 7 turns green, the score is updated and feedback is given with lamp 80 in FIG. 6. The individual scores, resulting from the evaluation of each response, are shown in the "OK" column 105 of FIG. 7 and the class performance for that exercise is seen from the colors of the performance bar 108.

The teacher may perform on-line scoring, i.e. score unanticipated responses, whether open-ended or not, or change scores by clicking in OK column 105 in FIG. 7 opposite a particular student's name, and choosing the score from a list of scores.

The teacher may also choose to show one or more responses on the screen of each student associated with the lesson, or to the whole class on a local Class Display screen, either is anonymously or not, by clicking on a student's response or on a student's name, respectively, and utilizing icon 111 in FIG. 7.

In Self-paced mode the teacher monitors the student responses as in FIG. 7, and can intervene verbally, or via the "Chat" function 112 in FIG. 7 or via "Indicator" box 127 in FIG. 8. Here, the pace of the lesson is determined by each student individually since each student chooses an exercise at the student's own pace by utilizing the "Go To," "Back" and "Next" buttons 87, 88 and 89 respectively, in FIG. 6.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A networked teaching and learning system, comprising:
a plurality of student computers, each student computer having an input device and a screen;
a teacher's computer having an input device and a screen, wherein said teacher's computer input device is adapted to receive web pages; and
a server at a Web site for publishing a Web page,
wherein the teacher's computer includes program instructions for importing the Web page, generating a Uniform Resource Locator (URL) and transmitting the URL to one or more of the student computers, and for enabling a selected student to display on the student computers further information including at least one of a live pointer and a marked up Web page,
wherein each student computer includes program instructions for displaying the Web page by selecting the URL, and for generating the further information displayed on the student computers.

2. A networked teaching and learning system, comprising:
at least one data storage server for storage of one or more lessons, wherein each lesson includes one or more exercises, wherein each exercise has one or more questions, wherein a question has a multi-character answer;
a plurality of student computers, wherein each student computer has an input device and a screen; and
a teacher's computer having an input device, a screen and a response server, wherein the teacher's computer input device is adapted to receive web pages,
wherein the response server is in communication with the student computers for processing student responses,
wherein the teacher's computer includes program instructions responsive to inputs to cause an exercise, including a Web page, to be displayed on the screen of at least one of the student computers, and to enable a selected student to display on the student computers further information including at least one of a live pointer and a marked up Web page,
wherein each student computer includes program instructions responsive to inputs to cause an exercise, including a Web page, to be displayed on the screen of the student computer, and to generate the further information displayed on the student computers,
wherein the teacher's computer includes program instructions for the teacher's screen to be contemporaneously responsive to a sequence of Web links selected from a student computer, and to an input received from the student computers.

3. The system of claim 1, wherein the teacher's computer and the student computer s communicate via the Internet.

4. The system of claim 1, wherein the teacher's computer and the student computers communicate via an intranet.

5. The system of claim 1, wherein the further information includes a live pointer.

6. The system of claim 1, wherein the further information includes a marked up Web page.

7. The system of claim 1, wherein the teacher's computer is responsive to responses received from the student computers contemporaneously with such received responses.

8. The system of claim 1, wherein a parent may check on student performance using an additional attached computer.

9. The system of claim 2, wherein the teacher's computer and the student computer s communicate via the Internet.

10. The system of claim 2, wherein the teacher's computer and the student computers communicate via an intranet.

11. The system of claim 2, wherein the further information includes a live pointer.

12. The system of claim 2, wherein the further information includes a marked up Web page.

13. The system of claim 2, wherein a parent may check on student performance using an additional attached computer.

14. The system of claim 2, wherein the teacher's computer further includes program instructions for:
   selecting a student response; and
   modifying a score for the response resulting from comparison of the response including the further information with the answer to a question.

15. The system of claim 2, wherein the teacher's computer is responsive to responses received from the student computers contemporaneously with such received responses.

* * * * *